United States Patent
Muszynski et al.

(10) Patent No.: US 10,677,219 B2
(45) Date of Patent: Jun. 9, 2020

(54) CONTROL SYSTEM IN A CONVERTER AND A METHOD OF OPERATING A CONVERTER

(71) Applicant: ABB Technology Oy, Helsinki (FI)

(72) Inventors: Peter Muszynski, Espoo (FI); Kalle Huju, Kirkkonummi (FI); Jussi Tamminen, Espoo (FI); Antti Vilhunen, Helsinki (FI); Antti Virta, Helsinki (FI)

(73) Assignee: ABB Schweiz AG, Baden (CH)

( * ) Notice: Subject to any disclaimer, the term of this patent is extended or adjusted under 35 U.S.C. 154(b) by 253 days.

(21) Appl. No.: 15/944,225

(22) Filed: Apr. 3, 2018

(65) Prior Publication Data

US 2018/0283351 A1    Oct. 4, 2018

(30) Foreign Application Priority Data

Apr. 4, 2017 (EP) .................................... 17164751

(51) Int. Cl.
  F03D 7/00 (2006.01)
  F03D 7/02 (2006.01)
  (Continued)

(52) U.S. Cl.
  CPC ........... F03D 7/0284 (2013.01); F03D 7/048 (2013.01); F03D 9/257 (2017.02); H02J 3/1892 (2013.01);
  (Continued)

(58) Field of Classification Search
  CPC .......... H02J 3/1892; H02J 3/383; H02J 3/386; H02J 3/46; F05B 2270/335;
  (Continued)

(56) References Cited

U.S. PATENT DOCUMENTS

| 9,593,667 B2 * | 3/2017 | Gupta ....................... F03D 7/00 |
| 2013/0027993 A1 * | 1/2013 | Tan ........................ H02M 7/515 |
| | | 363/40 |

(Continued)

FOREIGN PATENT DOCUMENTS

| EP | 2733811 A2 | 5/2014 |
| EP | 2876768 A1 | 5/2015 |

OTHER PUBLICATIONS

European Patent Office, Extended Search Report issued in corresponding Application No. 17164751.4, dated Oct. 16, 2017, 7 pp.

*Primary Examiner* — Alfonso Perez Borroto
*Assistant Examiner* — Esayas G Yeshaw
(74) *Attorney, Agent, or Firm* — Taft Stettinius & Hollister LLP; J. Bruce Schelkopf

(57) ABSTRACT

A method and a control system adapted to control a power conversion system connected to an AC power grid, wherein the control system is adapted to receive an externally provided reactive power reference and the control system includes a controller adapted to control the reactive power fed to the AC grid by the power conversion system and to produce a reactive current reference, an active current reference, a total current limiter for producing limited active and reactive current references. The total current limiter operates in reactive current priority limiting the active current reference. Further including means adapted to produce a capacity signal indicating the current capacity of the power conversion system. The control system further includes a minimum reactive power reference tracker adapted to generate an internally generated reactive power reference which is adapted to be fed to the controller adapted to control the reactive power fed by the power conversion system to the AC grid, where the minimum reactive power reference tracker is adapted to control the internally gener- (Continued)

ated reactive power reference to a value with which the active current reference is not limited.

20 Claims, 3 Drawing Sheets

(51) Int. Cl.
    *H02M 5/458*    (2006.01)
    *F03D 9/25*    (2016.01)
    *H02J 3/38*    (2006.01)
    *H02J 3/46*    (2006.01)
    *F03D 7/04*    (2006.01)
    *H02J 3/18*    (2006.01)
    *H02P 101/15*    (2016.01)

(52) U.S. Cl.
    CPC .............. *H02J 3/383* (2013.01); *H02J 3/386* (2013.01); *H02J 3/46* (2013.01); *H02M 5/458* (2013.01); *F05B 2270/335* (2013.01); *F05B 2270/337* (2013.01); *H02P 2101/15* (2015.01); *Y02E 10/563* (2013.01); *Y02E 10/723* (2013.01); *Y02E 10/725* (2013.01); *Y02E 10/763* (2013.01)

(58) Field of Classification Search
    CPC .. F05B 2270/337; F03D 7/0284; F03D 9/257; F03D 7/048; H02M 5/458; H02P 2101/15; Y02E 10/563; Y02E 10/723; Y02E 10/725; Y02E 10/763
    See application file for complete search history.

(56) References Cited

U.S. PATENT DOCUMENTS

| | | | |
|---|---|---|---|
| 2013/0093241 A1* | 4/2013 | Lewis | H02M 7/797 307/22 |
| 2014/0056041 A1* | 2/2014 | Zhu | H02M 3/1584 363/56.01 |
| 2014/0339830 A1* | 11/2014 | Gupta | F03D 7/00 290/44 |
| 2017/0244347 A1* | 8/2017 | Garcia | H02J 3/16 |

\* cited by examiner

CONTROL SYSTEM IN A CONVERTER AND A METHOD OF OPERATING A CONVERTER

FIELD OF THE INVENTION

The present invention relates generally to grid connected power converters.

BACKGROUND OF THE INVENTION

Grid connected power converters are devices in which semiconductor switch components are used for producing alternating voltage for supplying power to the grid. Such converters are used, for example, in connection with solar power and wind power, and generally in power generating system in which a rotating generator is not synchronized with the grid to which power is to be fed.

An example of a grid connected converter is a three-phase voltage source inverter the output of which is connected to the grid. The gridconnected converter is typically referred to as a grid side converter (GSC). The grid side converter is connected to a DC link and power is fed to the grid side converter through the DC link from a machine side converter (MSC). The machine side converter is connected to a rotating generator which is rotated by an energy source, such as wind or water.

In connection with solar power generation, the produced power is DC, and therefore machine side converter is not required. Instead, the DC voltage produced with the solar generator is modified to a suitable level such that the grid side converter can feed the produced power to the network.

Typical full power wind converter systems comprises a wind turbine controller (WTC) which provides an external AC voltage reference Uref1 and active power reference Pref to a power converter system. The wind turbine controller is an upper level controller which controls the overall operation of the converter system and related functions pertinent to the operation of the wind turbine such as but not limited to blade pitch control, communications with a higher level wind park controller. The power converter system has a grid side converter connected to the power grid by means of a wind turbine transformer and the collector system of the wind power park, and a machine side converter controlling the generator and a DC link connecting the two converters.

In the grid side converter an AC voltage controller regulates the grid side AC voltage and produces a reference value Ir_ref for reactive current. Further a DC-link controller regulates the DC voltage of the DC-link to a reference value and produces an active current reference Ia_ref.

Further, a typical implementation of a grid side converter includes a current limiter which enforces the currents to be within a certain limit. The current limiter can operate such that the current references Ir_ref and Ia_ref are kept under a limit Ilim according to $Ilim \geq \sqrt{Ia\_ref^2 + Ir\_ref^2}$. The limit Ilim is the maximum continuous current limit of the grid side converter. The current limiter operates in active current priority and produces limited current references Ia_ref_lim and Ir_ref_lim. With the active current priority it is referred to the operation principle according to which the reactive current reference Ir_ref_lim is appropriately lowered in case the said limit is reached or exceeded.

The grid side converter further comprises controllers for regulating active Ia and reactive Ir current injections towards the grid in response to their limited references Ia_ref_lim and Ir_ref_lim.

In a typical full power wind converter system the AC-voltage controller of the grid side converter follows the AC voltage reference Uref1 which is received from the wind turbine controller. The active power reference Pref which is received from the wind turbine controller is converted into a corresponding generator torque reference for the machine side converter which controls the wind turbine generator correspondingly. The power produced by the generator passes through the machine side converter and is injected into the DC-link. The DC-link voltage is regulated by the DC link controller of the grid side converter. The GSC of wind turbines are connected in many practical cases to very weak grids, that is so say, grids with such a high network impedance resulting in a low Short Circuit Ratio (SCR) at the wind power park grid connection point in the order of 1 . . . 2.

In case the above described converter systems are connected to very weak grids and are operating at or near nominal active power, they are frequently prevented operating in a stable manner within their nominal AC voltage operating band due to their current limit Ilim. This unstable operation is also referred to as 'voltage collapse' and is highly undesirable as it prevents normal power production.

This phenomenon is due to physical line transfer limits on realizable active power, reactive power and voltage (P,Q,U) points. These physical limits necessitate that in order to transfer a certain amount of active power P towards the grid a certain minimum voltage U must be maintained which, in turn, will lead to sufficient reactive power in order to ensure voltage stability. As a consequence, for a given Pref issued by the WTC, there exists a minimum AC voltage reference Uref1 which must be provided by the WTC to the converter system, in order to prevent a voltage collapse at the GSC terminals.

The chain of events that lead to the voltage collapse at the current limit Ilim is the following. When the AC voltage reference Uref1 is lowered, more active current is needed to create the same amount of active power according to Pref. Eventually when reaching the current limit Ilim, the required reactive current reserve $\sqrt{Ilim^2 - Ia\_ref\_lim^2}$ is used up, since the active current requirement increases faster than the reactive current requirement drops as a function of the converter AC voltage. Active current has priority, when the current limit Ilim is reached. This causes a reduction in reactive current, which again reduces the AC voltage at the GSC terminals, which again will result in an increased active current requirement. This chain of events will end up in the collapse of the converter AC voltage outside the nominal voltage operating band, driving the GSC into fault-ride-through mode or make it trip.

This minimum AC voltage reference Uref1 to be provided by the WTC increases with the grid X/R and decreasing short circuit ratio (SCR). For extreme weak grids with SCR=1 and moderate to high X/R the GSC must operate at elevated (>1 pu) AC voltage references in order to prevent voltage collapse.

The realizable (P,Q,U) points could be identified a priori by static load flow analysis (LFA) for a known grid scenario and stored in form of a look-up table within the WTC in order for the WTC to be able to issue appropriate active power and voltage references to the converter system Preventing voltage instability However, the actual variables, as for example wind farm SCR and loads near the connection point, are either unknown to the WTC or hard to estimate reliably. So in practice, the wind park controller and consequently the WTC will need to reserve a considerable 'safety margin' on the converter AC voltage reference Uref1 and/or Pref in order to minimize the risk of entering voltage collapse. However, reducing Pref (i.e. power curtailment) is undesirable as this will reduce the revenue of the wind farm and increasing Uref1 to an unnecessarily high value will limit the wind converter and thus wind park Q-capability which is undesirable from the perspective of the grid operator.

It would thus be desirable to operate the wind converter system in such a way that the active power reference is realized and the AC voltage reference is either realized or only minimally increased in order to facilitate stable operation of the converter.

BRIEF DESCRIPTION OF THE INVENTION

An object of the present invention is to provide a method and an control system for implementing the method so as to solve the above problems. The objects of the invention are achieved by a method and a control system which are characterized by what is stated in the independent claims. The preferred embodiments of the invention are disclosed in the dependent claims.

The invention is based on the idea of operating the wind power converter in reactive power priority and further, by forming an internal reactive power reference which is responsive to the externally provided reactive power reference and a capacity signal indicative of the unlimited current reference signal.

An advantage of the method and apparatus of the invention is that the operation in weak grids is not hindered by voltage collapse. Furthermore, as the apparatus prevents the curtailment of active power, higher efficiency in the operation of the system is obtained.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
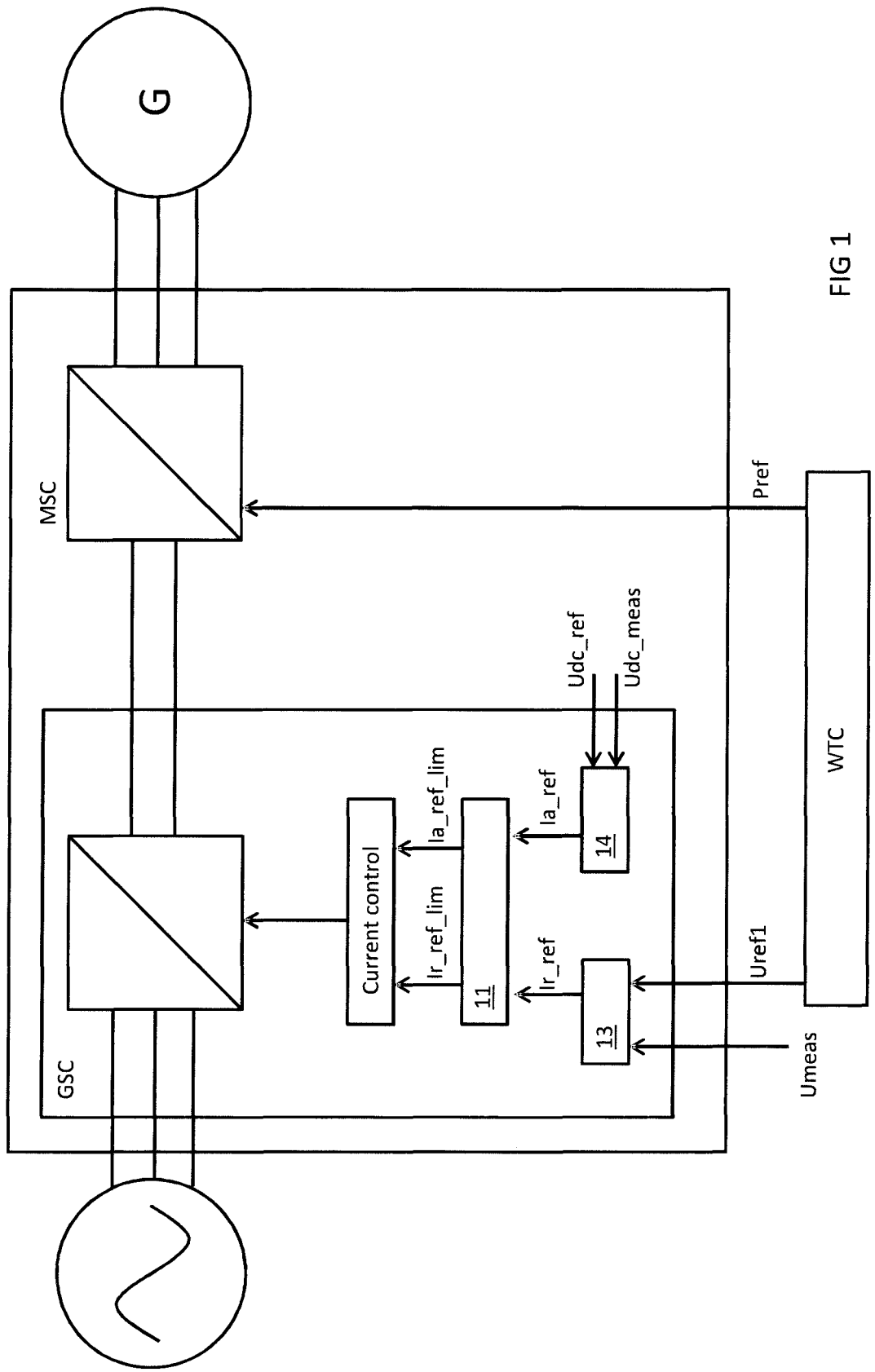
FIG. 1 is shows an example of wind power converter.

FIG. 1 shows a known wind power converter system. The power converter system comprises a grid side converter GSC, a machine side converter MSC and a DC link connecting the converters. In the example of FIG. 1 the power converter system is a full power converter system in which the total electrical power generated by the generator G is fed through the converters. Both, the GSC and MSC are operated as Voltage Source Converters (VSCs).

The wind power converter system receives a power reference Pref and voltage reference Uref1 from a wind turbine controller WTC which is an upper level controller within the turbine. The machine side converter MSC receives the power reference Pref and controls the torque of the generator accordingly so that the desired power is obtained.

The grid side converter receives an externally generated AC voltage reference Uref1, a measured AC grid voltage Umeas and controls the grid side converter with an AC voltage controller 13 accordingly and produces a reactive current reference Ir_ref. The grid side converter also controls the DC link voltage with DC link controller 14 to a reference value Udc_ref using the measured DC link voltage Udc, and produces an active current reference Ia_ref which is fed to the limiting block 11. The reactive current reference and the active current reference are fed to a limiter 11, which limits the current references in such a way that the current limit Ilim of the converter is not exceeded. In the known control systems priority is given to the active current reference and thus the reactive current reference may be limited. The limited current references Ir_ref_lim, Ia_ref_lim are given to current controllers which generate a control signal to drive the grid side converter to produce the requested currents. The grid side converter thus operates based on said control signal such that the DC link voltage and the AC grid voltage are driven to their references.

Figure 2:
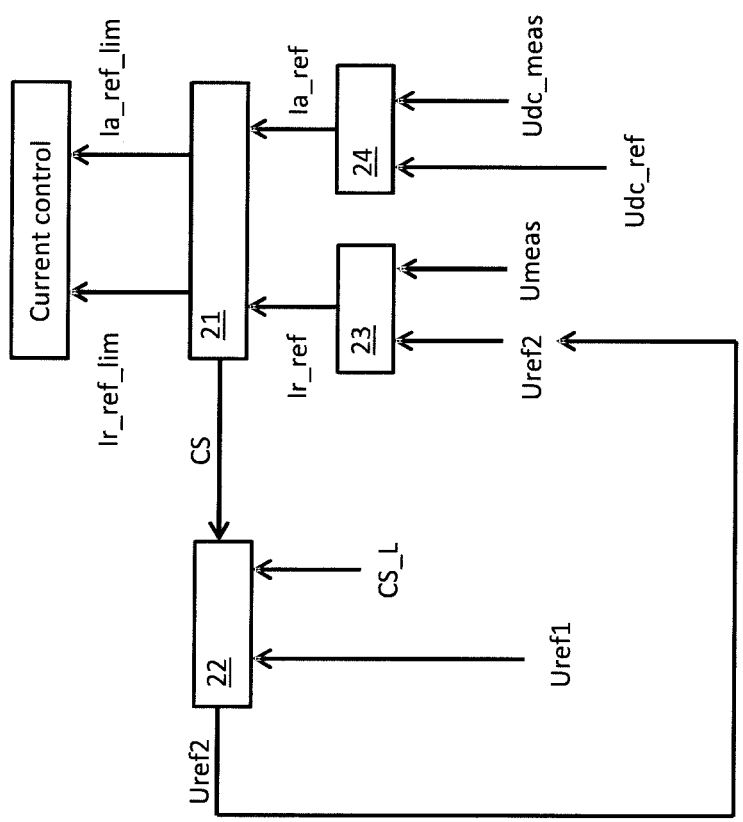
FIG. 2 shows an overall control structure according to an embodiment of the present invention.

In the present invention, the above controller structure is modified as shown in FIG. 2. More specifically, according to the present invention the total current limiter is adapted to operate in reactive current priority limiting the active current when the total current composed of reactive current reference and active current reference exceeds a set limit.

When operating in reactive current priority the total current limiter calculates the unlimited value of the current references as $\sqrt{Ia\_ref^2 + Ir\_ref^2}$. This value is kept under limit value Ilim by limiting the value of active current reference Ia_ref to value Ia_ref_lim. In case the grid voltage reference Uref increases from the current measured value Umeas, the AC voltage controller increases its output which is the reference of the reactive current. If the unlimited value of the current reference increases above the limit, the value of active current reference is limited such that the current limit is not exceeded. The current limiter of the embodiment limits preferably only the active current reference and thus the reactive current reference is not limited. Thereby the limited reactive current reference corresponds preferably to the reactive current reference that is fed to the limiter block.

In general concept of the invention, the above presented AC voltage controller is a reactive power controller as the AC voltage controller produces reference for the reactive current. Thus in the above description of the known structure the grid side voltage reference is a reactive power reference. The invention is described below in connection with an embodiment in which an AC voltage controller receiving AC voltage reference is used as reactive power reference.

According to the invention, the control system comprises means adapted to produce a capacity signal CS indicating the current capacity of the power conversion system, and the capacity signal has a limit value.

FIG. 2 shows an embodiment of the controller structure of the invention. More specifically, FIG. 2 shows the modifications of the controller structure of FIG. 1. According to the embodiment, the controller structure comprises a minimum reactive power reference tracker 22 which is adapted to receive the externally provided reactive power reference Uref1, the capacity signal CS and the limit value CS_L set for the capacity signal. The minimum reactive power reference tracker is further adapted to generate an internally generated reactive power reference Uref2 which is adapted to be fed to the controller 23 adapted to control the reactive power.

In the embodiment of FIG. 2 the inputs to the reactive power reference tracker 22 (MinUrefT) are the voltage reference Uref1 given by the wind turbine controller and a capacity signal CS together with the limit value set for the capacity signal CS_L. In the preferred embodiment the capacity signal is the unlimited current reference signal $\sqrt{Ia\_ref^2+Ir\_ref^2}$ which is provided by the current limiter block 21.

The MinUrefT-block in FIG. 2 receives the limit value set for the capacity signal as a provided signal. However, the limit value may also be a value contained in the MinUrefT-block itself. When the limit value set for the capacity signal is provided outside of the block, the value can be adjusted.

The output of the MinUrefT block 22 is an internally generated voltage reference signal Uref2. In the preferred embodiment the capacity signal CS is the unlimited current reference signal $\sqrt{Ia\_ref^2+Ir\_ref^2}$ and the continuous maximum or the limit value set for the capacity signal CS_L for that signal is the converter total current limit Ilim.

In a preferred embodiment the capacity signal is the total current of reactive current reference and active current reference and the limit value set for the capacity signal is the current limit of the grid side converter.

Figure 3:
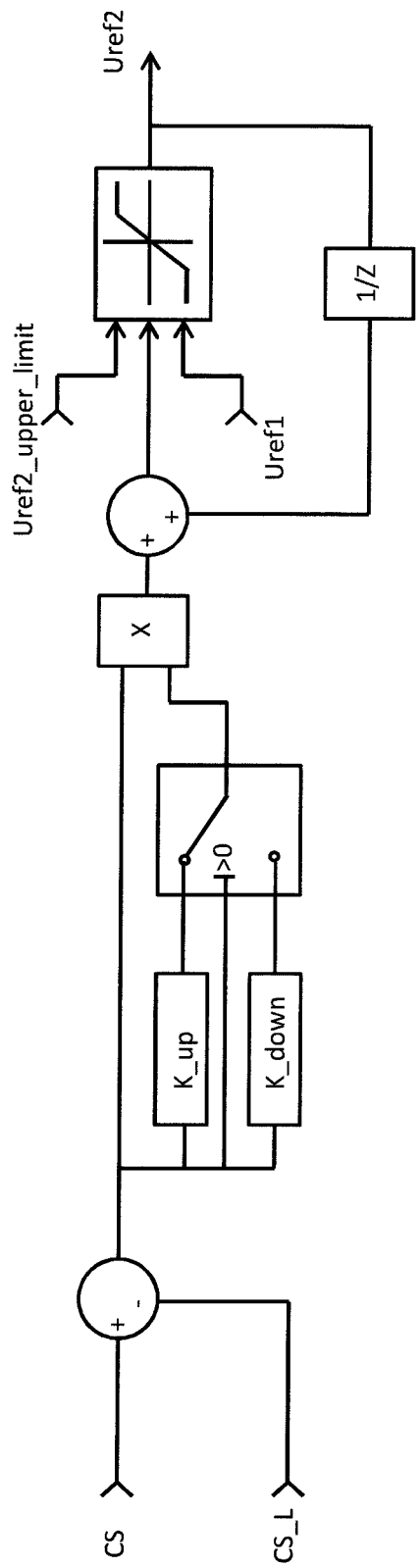
FIG. 3 shows the details of the inventive control structure according to an embodiment of the present invention.

In FIG. 3, the MinUrefT block functionality is shown in more detail. The controller used in the MinUrefT block is an integral controller for which the reference signal is the limit value set for the capacity signal CS_L and actual signal is the capacity signal. The controller can have different integration time constants K_up, K_down for increasing and decreasing the output signal Uref2 at appropriate rates. In the preferred embodiment, the time constant for raising Uref2 in case the capacity signal exceeds its set limit value may be shorter than for lowering Uref2.

A limiter for the integrator 31 and output limiter 32 is introduced which forces the output Uref2 of the controller and the controller integrator to remain at Uref1 or above. The upper limit Uref2_upper_limit prevents that Uref2 is raised above the continuous voltage operating band of the converter and may be set in one embodiment to 1.1 pu rated voltage.

The operation of the MinUrefT block is the following. Once the capacity signal, which is in the preferred embodiment the unlimited converter current reference is above the set limit value CS_L which is in the preferred embodiment the converter continuous current maximum value, the block will increase Uref2 so that the unlimited converter current reference will remain under or at the converter continuous current maximum value Ilim and thus no active current reduction is done.

The capacity signal SC used in the invention is a signal which can be used to indicate the current capacity of the converter. As mentioned above and described in detail above, the capacity signal is preferably the unlimited converter current reference. The capacity signal may also be a signal indicating the temperature of the converter, $I^2t$-signal relating to temporary converter overload current, converter estimated current measured current or current reference. If a capacity signal exceeds its limit value, the present invention reduces the currents by affecting reactive power reference in the manner described above.

In an embodiment using the $I^2t$-signal the capacity signal is generated from an $I^2t$ integral value maintained by a short term current overload controller wherein said short term current overload controller provides an appropriate converter current limit to the total current limiter in response to a comparison of the $I^2t$ integral value to a set limit value. In this embodiment, the MinUrefT block may compare the received capacity signal, derived from $I^2t$ integral value, to a predetermined value corresponding to marginal short term overload current.

According to an embodiment of the invention, the capacity signal is obtained from the amount by which the active current reference is limited and the limit value set for the capacity signal is zero. In the embodiment the capacity signal indicates the amount of active current reduction. Considering FIG. 3, the error signal fed to the controller is CS-CS_L which is the amount of clipped active current when the limit value set for the capacity signal is zero. The controller of FIG. 3 rises the value of internally generated voltage reference Uref2 until the active current is not clipped anymore and thus capacity signal is zero.

In the embodiment of FIG. 2 it is shown that the active current reference Ia_ref is obtained from a DC link controller. However, the active current reference may be obtained also from other sources. In one embodiment, the machine side converter may be controlling the DC link voltage and the GSC may receive the active power reference Pref. In such an embodiment the active current reference is derived from dividing the active power reference Pref by an appropriately filtered AC voltage measurement. In the invention, the converter comprises the active current reference and the mentioned current reference may be obtained from a multiple of sources. The active current reference is preferably received in the current limiter block 21.

Further, the internally generated voltage reference Uref2 may be set equal to the externally provided voltage reference in case the externally provided voltage reference is higher than the internally generated voltage reference.

Further, the actual value of active power injected to the grid after the limiting and the internally generated voltage reference may be signalled back to the wind turbine controller. The wind turbine controller may act to start curtailing of active power reference Pref for bringing the internally generated voltage reference down to externally provided voltage reference or to increase the externally provided voltage reference to be in line with the internally generated voltage reference.

The dynamics in the MinUrefT block is obtained by the fact that the AC grid voltage controller 13 provides the reactive current reference. Once the internally generated voltage reference is increased and fed to the AC grid voltage controller, the reactive current reference Ir_ref is increased. As the reactive current reference is increased, the converter voltage is increased and the active current requirement to produce the reference power is lowered. The total current limiter allows the active current to be at its reference Ia_ref since the active current requirement reduces faster than the reactive current to increase the converter voltage. The internally generated voltage reference Uref2 is increased until the total current limiter is not limiting the current references.

During the operation of the converter, the MinUrefT block maintains it's AC voltage reference Uref2 and updates it regularly. When operating according to the invention and minimizing the reduction of active current reference, the curtailment of active power is avoided and power reference is followed. Further, when the internally generated voltage reference is increased just above the minimum value required to avoid reduction of the current, the reactive power capability is optimized relative to externally provided AC voltage reference Uref1 without involving the wind turbine controller.

As mentioned above, the externally provided voltage reference Uref1 is an example of an externally provided reactive power reference Qref1. Another example of a reactive power reference is a power factor reference PFref1. Although the reference is made in the above to an embodiment with voltage references Uref1, Uref2 and a voltage controller, the operation is analogous in connection with externally provided reactive power reference Qref1 or with externally provided power factor reference PFref1. For example, in connection with an externally provided reactive power reference Qref1, the total current limiter 21 provides a capacity signal to the MinUrefT block according to which an internally generated reactive power reference Qref2 will be provided. In such an embodiment the block 23 will derive the reactive current reference ir_ref from dividing the internally generated reactive power reference Qref2 received from (22) by an appropriately filtered AC voltage measurement.

For example in connection with an externally provided power factor reference PFref1, the current limiter provides a capacity signal according to which an internally generated power factor reference PFref2 is generated. The generated power factor reference PFref2 is fed to the power factor controller.

The externally provided reactive power reference may also assume multiple of formats. The reactive power reference may be an absolute value of the reactive power, a percentage of reactive power from a nominal value or an offset-value relative the nominal value, for example. These formats are applicable to various presentations of reactive power reference (PFref1, Qref1, Uref1).

In the above, the invention and its embodiments are described in connection with a full power converter system. The converter system comprises a grid side converter and machine side converter and a DC link connecting the two converters. In above, control of the DC link voltage is described as being carried out by the grid side converter and the MSC receiving an active power reference Pref for controlling the generator power infeed. However, the machine side converter can alternatively carry out the control of the DC link voltage by commanding an appropriate generator power infeed into DC and the grid side converter may control the active power that is injected to the grid based on reception of the Pref signal. It will be obvious to a person skilled in the art that the converter reactive current reference and active current reference can be formed without a DC link controller or AC voltage controller. The presented invention is applicable to prior art where active current reference and reactive current reference are formed by other means from the reactive power and active power references, for example direct power control.

The invention is also applicable in connection with doubly fed induction generator (DFIG) systems. In such systems the rotor of the generator is connected with a converter system to the grid and the stator is also connected to the grid in known manner. In DFIG systems the GSC, MSC converters do not have to be dimensioned to the full power of the generator. In DFIG converter systems the reactive power is controlled by the machine side converter by means of an appropriate excitation current fed to the DFIG rotor. Active power is controlled by the MSC by converting the received active power reference Pref into appropriate rotor active current references controlling the DFIG machine torque. The control principles of the present invention and it's embodiments are directly applicable to the reactive power controllers residing in the MSC controlling a DFIG system.

The invention can also be applied in connection with a grid connected solar system. In such system a PV-panel system produces a DC voltage. The produced DC voltage is controlled to a desired value in a DC link, and a grid side converter is connected to the DC link as in the case described above in detail.

The invention can also be directly applied in connection with a HVDC converter system. In such system one HVDC terminal, the sending end, will absorb power from the AC grid and convert it into DC currents fed into the DC transmission link. The receiving HVDC converter station will control the DC-transmission system voltage to a set reference limit by injecting an appropriate amount of active currents to its AC grid connection. Moreover, the receiving HVDC stations may perform AC-voltage control in the same way as described above in detail for a grid side converter of a wind turbine.

Multiple of frequency converter drives comprise an active front end. In a motor drive with the power is generally taken from the grid, rectified, and further inverted to produce alternating voltage to a motor. If the rectifier is equipped with controllable semiconductor switches, the rectifier is an active from end and it is able to transmit power in both directions. The motor acts as a generator when the rotation of the motor is actively braked. In case the power can be fed back to grid through the active front end, the present invention can be applied in the frequency converter.

The present invention relates also to a method of operating a converter comprising a DC link for receiving power to the converter. In the method, an external reactive power reference is received in the converter. The method comprises further controlling the reactive power fed to the AC grid and producing a reactive current reference Ir_ref and controlling the voltage of the DC link and producing an active current reference Ia_ref. Further in the method, the active current reference is limited with a total current limiter if the total current composed of reactive current reference and active current reference exceeds a set limit.

Further in the method an internally generated reactive power reference is generated based on the externally provided reactive power reference and signal from the total current limiter, and the internally generated reactive power reference is set to a value with which the active current reference is not limited.

The MinUrefT block can be implemented for example with the software of the converter. The controllers used in connection with the invention are conventionally implemented and their structure and form are not described in more detail. Further, the actual main circuit of the converter and the wind power converter system are not described in detail. The converter can, for example, be a pulse width modulated converter.

It will be obvious to a person skilled in the art that the inventive concept can be implemented in various ways. The invention and its embodiments are not limited to the examples described above but may vary within the scope of the claims.

The invention claimed is:

1. A control system adapted to control a power conversion system connected to an AC power grid, wherein said control system is adapted to receive an externally provided reactive power reference and the control system comprises
a controller adapted to control the reactive power fed to the AC grid by said power conversion system and to produce a reactive current reference (Ir_ref), an active current reference (Ia_ref), and a total current limiter for producing limited active and reactive current references (Ia_ref_lim, Ir_ref_lim),
wherein the total current limiter is adapted to operate in reactive current priority limiting the active current reference when the total current composed of reactive current reference and active current reference exceeds a set limit and means adapted to produce a capacity signal (CS) indicating the current capacity of the power conversion system, the capacity signal having a limit value (CS_L), a minimum reactive power reference tracker adapted to receive the externally provided reactive power reference and the capacity signal, and further adapted to generate an internally generated reactive power reference (Uref2) based on the externally provided reactive power reference, the capacity signal and the limit value set for the capacity signal, which internally generated reactive power reference (Uref2) is adapted to be fed to the controller adapted to control the reactive power fed by the power conversion system to the AC grid, wherein the minimum reactive power reference tracker is adapted to control the internally generated reactive power reference (Uref2) to a value with which the active current reference is not limited.

2. The control system according to claim 1, wherein the capacity signal is the total current composed from reactive current reference and active current reference and the limit value (CS_L) set for the capacity signal is the current capacity of the converter.

3. The control system according to claim 1, wherein the capacity signal is obtained from the amount by which the active current reference is limited and the limit value set for the capacity signal is zero.

4. The control system according to claim 2, wherein the capacity signal (CS) is obtained from the total current limiter.

5. The control system according to claim 1, wherein the capacity signal is composed from a $I^2t$ integral value maintained by a short term current overload controller, wherein said short term current overload controller provides a converter current limit to the total current limiter.

6. The control system according to claim 1, wherein the capacity signal is a signal indicating the temperature of the converter, estimated current of the converter, measured current of the converter or current reference of the converter, and the limit value set for the capacity signal is such that it prevents over currents of the converter.

7. The control system according to claim 1, wherein the externally provided reactive power reference is implemented as AC voltage reference (Uref1) and the controller adapted to control the reactive power is implemented as an AC voltage controller adapted to control the grid side AC voltage.

8. The control system according to claim 1, wherein the minimum reactive power reference tracker is adapted to increase the value of internally generated reactive power reference (Uref2) from the value of the externally provided reactive power reference (Uref1) when the capacity signal exceeds its set limit.

9. The control system according to claim 1, wherein the minimum reactive power reference tracker is adapted to set the value of the internally generated reactive power reference (Uref2) equal to externally provided reactive power reference if the externally provided reactive power reference is higher than the internally generated reactive power reference.

10. The control system according to claim 1, wherein the minimum reactive power reference tracker is adapted to increase the value of internally generated reactive power reference (Uref2) in response to the amount of the capacity signal exceeding its set limit.

11. The control system according to claim 1, wherein the minimum reactive power reference tracker composes an error signal from the capacity signal and its limit value and which is further adapted to feed said error signal into a controller adapted to generate the internally generated reactive power reference (Uref2).

12. A control converter system comprising:
a converter according to claim 1, wherein the converter system comprises an upper level controller and the internally generated reactive power reference is transmitted to the upper level controller which provides the externally provided reactive power reference.

13. The converter system according to claim 12, wherein the upper level controller is adapted to modify power reference given to the converter system until the externally provided reactive power reference equals to the internally generated reactive power reference.

14. A method of operating a converter comprising a DC link for receiving power to the converter, wherein the method comprises
receiving an external reactive power reference in the converter,
controlling the reactive power fed to the AC grid and producing a reactive current reference,
obtaining an active current reference,
limiting the active current reference (Ia_ref) when the total current composed of reactive current reference and active current reference exceeds a set limit,
producing a signal indicating converter capacity,
generating an internally generated reactive power reference based on the externally provided reactive power reference, said capacity signal, and
setting the internally generated reactive power reference to a value with which the active current reference is not limited.

15. The control system according to claim 3, wherein the capacity signal (CS) is obtained from the total current limiter.

16. The control system according to claim 2, wherein the externally provided reactive power reference is implemented as AC voltage reference (Uref1) and the controller adapted to control the reactive power is implemented as an AC voltage controller adapted to control the grid side AC voltage.

17. The control system according to claim 1, wherein the minimum reactive power reference tracker is adapted to increase the value of internally generated reactive power reference (Uref2) from the value of the externally provided reactive power reference (Uref1) when the capacity signal exceeds its set limit.

18. The control system according to claim 2, wherein the minimum reactive power reference tracker is adapted to set the value of the internally generated reactive power reference (Uref2) equal to externally provided reactive power reference if the externally provided reactive power reference is higher than the internally generated reactive power reference.

19. The control system according to claim 2, wherein the minimum reactive power reference tracker is adapted to increase the value of internally generated reactive power reference (Uref2) in response to the amount of the capacity signal exceeding its set limit.

20. The control system according to claim 2, wherein the minimum reactive power reference tracker composes an error signal from the capacity signal and its limit value and which is further adapted to feed said error signal into a controller adapted to generate the internally generated reactive power reference (Uref2).

* * * * *